Oct. 22, 1968  T. A. CIARLARIELLO  3,406,563
METHOD AND APPARATUS FOR MEASURING THE QUALITY
OF A GASEOUS FLUID
Filed Dec. 6, 1965
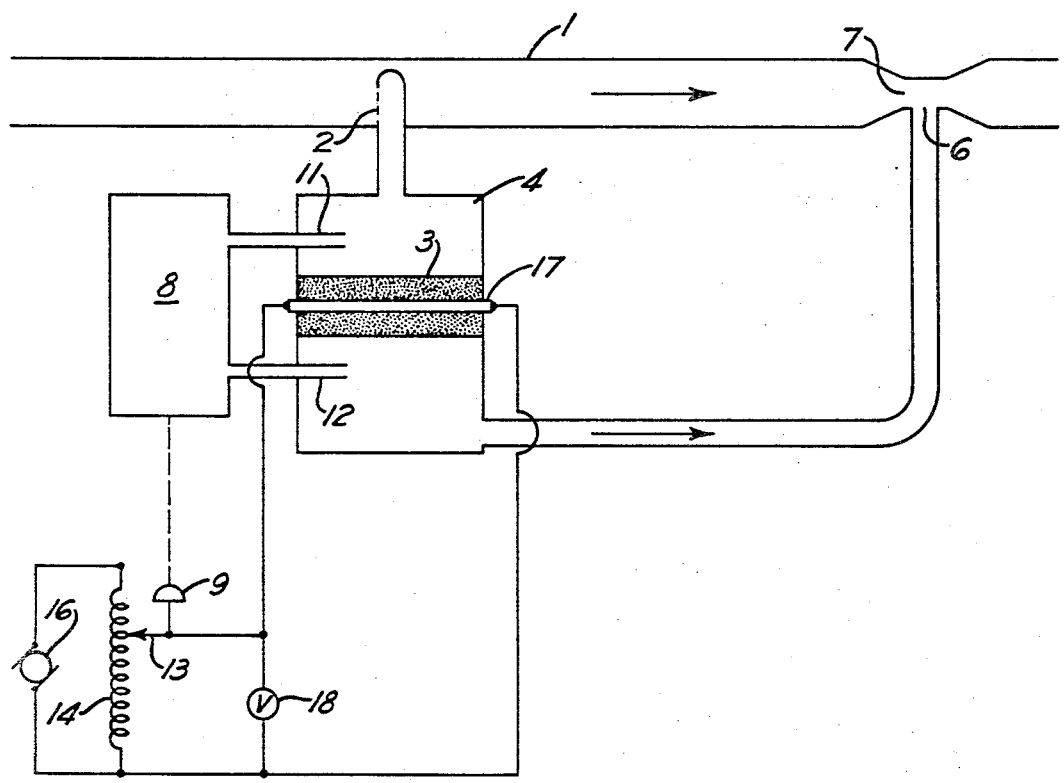
INVENTOR.
THOMAS A. CIARLARIELLO
BY
Brown, Critchlow, Flick & Peckham
ATTORNEYS.

United States Patent Office 3,406,563
Patented Oct. 22, 1968

3,406,563
METHOD AND APPARATUS FOR MEASURING THE QUALITY OF A GASEOUS FLUID
Thomas A. Ciarlariello, Zelienople, Pa., assignor to Mine Safety Appliances Company, a corporation of Pennsylvania
Filed Dec. 6, 1965, Ser. No. 511,731
8 Claims. (Cl. 73—29)

ABSTRACT OF THE DISCLOSURE

Relative dryness of a double phase gaseous fluid composed of a dry vapor and an entrained liquid of the same chemical composition is measured by trapping a sample of the entrained liquid in a filter, causing a pressure drop across the filter. A pressure sensor maintains a predetermined pressure drop by regulating the current to a heater and thereby maintaining a balance between the liquid trapped and driven off. The heat necessary to maintain this balance is proportional to the liquid input and a measure of the relative dryness of the fluid.

---

This invention relates to a method and apparatus for determining the quality or relative dryness of a gaseous fluid. When such a fluid is in a condition intermediate between a liquid and a dry vapor, it is sometimes called a "wet vapor" and is said to have a certain "quality" that may be defined as the ratio of the weight of the vaporized portion (dry vapor) to the total weight of the fluid (dry vapor plus entrained liquid). Although the term "quality" was originally applied to steam, it is used herein to include double-phase fluids having a dry vapor component and an entrained liquid component of the same chemical composition. It is implicit in this definition that the fluid to be tested is at a temperature corresponding to the boiling point of its liquid component, otherwise it would not exist in both liquid and vapor phases.

It is among the principal objects of the present invention to provide a method and apparatus that will measure the quality of a double-phase gaseous fluid continuously and automatically by measuring the latent heat of vaporization of the liquid component; that will be simple to maintain and operate, and that will be sensitive and reliable in use.

Other objects will be apparent from the following description of a preferred embodiment of the invention in connection with the attached drawing, which illustrates, somewhat diagrammatically, the apparatus of the invention.

The present invention is predicated on the discovery that, if a double-phase gaseous fluid in the form of a wet vapor is passed through a porous filter having small diameter tortuous passages made of a material that is wetted by the liquid droplets entrained in the fluid, the dry vapor will continue through the filter, but the liquid droplets will be retained by surface tension in the filter passages. The liquid will selectively fill first the smaller passages and then the larger ones. As these passages fill with liquid, the effective gas flow area decreases; at the same time, the pressure drop across the filter increases. The pressure drop is, therefore, a measure of the liquid inventory in the filter. In accordance with the present invention, this pressure drop is monitored by a differential pressure sensor, which controls the application of heat to the filter in an amount that will maintain a constant liquid inventory therein. Under such conditions, the heat input to the filter will equal the heat required to vaporize all of the liquid in the entering gas. In other words, the heat input to the filter will be directly proportional to the liquid input and will vary in an inverse manner with the quality of the entering gas.

Referring to the drawing, the gaseous fluid that is to be monitored is assumed to be flowing in the direction indicated, and preferably at a constant rate, through a conduit 1. A sample of this gas is drawn continuously from the conduit by a sampling nozzle 2, passed through a filter 3 in a chamber 4, and returned through an outlet 6 to the conduit at a venturi constriction 7 therein. This last element provides gas flow through the sampling line, and this flow is preferably at a constant rate. Filter 3 may be a conventional filter made from a material that will be wetted by the liquid component of the gas stream. For many applications, including monitoring the quality of the wet vapor of alkali metals, a conventional micrometallic filter made from sintered metallic particles is perfectly suitable. In such a filter, the voids between the metal particles provide tortuous fluid passages that are much longer than the thickness of the filter and have a diameter on the order of from 2 to 8 microns.

As the gas stream (vapor-liquid) goes through the filter passages, the stream changes direction many times. At each direction change, the liquid droplets entrained in the gas stream impinge against the walls of the passages and are deposited and retained there by surface tension. As the gas flow continues its entrained liquid selectively fills first the smaller passages and then the larger ones, and there is a corresponding reduction in the filter area available for gas flow and a corresponding increase in the pressure drop across the filter. This pressure drop is continuously monitored and held constant at a desired level by a conventional differential pressure sensor 8 and its associated controller 9. The sensor is provided with the usual pair of tubes 11 and 12 extending into the chamber on opposite sides of the filter; and the controller operates slider 13 on the secondary winding of a variable autotransformer 14. The primary of the latter is connected to an AC current source 16 and the secondary to a resistance heater element 17 in heat exchange relation with the filter 3. When the differential pressure across the filter exceeds (or falls below) a predetermined level, the heat input to the filter is varied so that the liquid trapped in the filter will be vaporized therefrom at the same rate as liquid is added thereto from the entering gas. In other words, the liquid inventory of the filter remains constant. Upon such conditions, the heat input to the filter is directly proportional to the liquid content of the entering gas. If the gas flow rate through the filter is constant, as is generally preferred, the heat input will be a direct measure of the quality of the gas, and may be indicated by any suitable means. One example of such means is a voltmeter 18 connected across the heater. Assuming that the electrical resistance of the heater remains constant, then the heat input or power supplied to the heater will be proportional to the square of this voltage. On the other hand, if the gas flow rate through the filter is variable, the quality of the gas may be determined by dividing the heat input by the gas flow, the latter being measured by appropriate and well-known devices.

It is among the advantages of the present invention that, although the apparatus involved is very simple, it is still very sensitive to variations in the quality of the gaseous fluid under observation. This is so because the heat transfer coefficient between the filter passage walls and the gas is high, that coefficient being inversely proportional to the diameter of the passages and those diameters being quite small; as a result, it is possible to vaporize the liquid filling those passages by means of low thermal gradients, so that only a small quantity of heat will go to superheat the dry vapor. In referring herein to a passage being filled with liquid, what is meant is that sufficient liquid is entrapped in a passage to block the flow of gas therethrough, without necessarily filling the passage from end to end. It will also be understood that, if the pressure differential across the filter becomes too large, liquid can be blown out of the filter passages, instead of leaving those passages only by evaporation. Therefore, the pressure drop, ΔP, should be kept below that given by the following formula:

$$\Delta P = p/R$$

where $p$ is the surface tension and $R$ is the pore radius (radius of the passage).

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for determining the quality or relative dryness of a fluid composed of a dry vapor component and an entrained liquid component of the same chemical composition, comprising a porous filter having micro-passages therethrough in a range of different diameters, the walls of said passages being wettable by the liquid component, means for passing the fluid through the filter passages to entrap the liquid component by surface tension first in the smallest diameter passages and then in progressively larger diameter passages, thereby to block fluid flow through those passages and increase the pressure differential across the filter, means for heating the filter to vaporize some of the liquid entrapped therein, and means responsive to the pressure differential across the filter for controlling the heat input to the filter to provide a constant liquid inventory in the filter while the fluid is passing therethrough, whereby the heat input will equal the heat required to vaporize all of the liquid component of the fluid entering the filter and will be a measure of the quality of that fluid.

2. Apparatus according to claim 1, in which the filter is a micro-metallic filter made from sintered metallic particles.

3. Apparatus according to claim 1, in which the diameters of the filter passages range from about 2 to about 8 microns.

4. Apparatus according to claim 1, in which means is provided to pass the fluid through the filter at a substantially constant rate.

5. Apparatus according to claim 1, in which said heating means includes an electrical resistance heater in heat exchange relation to the filter.

6. Apparatus according to claim 5, in which said responsive means also includes a variable autotransformer connected between an electric current source and the heater, with the current delivered to the heater from the transformer being controlled by said pressure differential sensor.

7. The method of determining the quality or relative dryness of a fluid composed of a dry vapor component and an entrained liquid of the same chemical composition that includes the following steps: passing the fluid through a porous filter provided with micro-passages having a range of different diameters and having surfaces that are wetted by the liquid component, thereby to entrap the liquid component by surface tension first in the smaller passages and then in progressively larger passages, heating the filter by an amount sufficient to maintain the pressure drop across the filter at a predetermined constant level, whereby the heat input to the filter will equal the heat required to vaporize all of the liquid in the fluid entering the filter and will be a measure of the quality of that fluid.

8. The method according to claim 7, in which the fluid is passed through the filter at a substantially constant flow rate.

References Cited

UNITED STATES PATENTS 2,359,278   10/1944   Allen _____ 73—76

RICHARD C. QUEISSER, *Primary Examiner.*

HERBERT GOLDSTEIN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,563                      October 22, 1968

Thomas A. Ciarlariello

It is certified that error appears in the above identified patent and that said Letters Patent are hereby corrected as shown below:

Column 3, line 7, "$\Delta P = p/R$" should read -- $\Delta P = 2p/R$ --.

Signed and sealed this 24th day of February 1970.

(SEAL)
Attest:

Edward M. Fletcher, Jr.                  WILLIAM E. SCHUYLER, JR.
Attesting Officer                          Commissioner of Patents